(12) United States Patent
Schuling

(10) Patent No.: US 11,919,480 B2
(45) Date of Patent: Mar. 5, 2024

(54) ADJUSTABLE VEHICLE SIDE STEP ASSEMBLIES FORMED BY MULTI-PIECE BODIES

(71) Applicant: Dee Zee, Inc., Des Moines, IA (US)

(72) Inventor: Eric Schuling, Bondurant, IA (US)

(73) Assignee: Dee Zee, Inc., Des Moines, IA (US)

( * ) Notice: Subject to any disclaimer, the term of this patent is extended or adjusted under 35 U.S.C. 154(b) by 283 days.

(21) Appl. No.: 17/392,784

(22) Filed: Aug. 3, 2021

(65) Prior Publication Data

US 2023/0038685 A1 Feb. 9, 2023

(51) Int. Cl.
*B60R 3/00* (2006.01)
(52) U.S. Cl.
CPC ...................... *B60R 3/00* (2013.01)
(58) Field of Classification Search
CPC ................. B60R 3/00; B60R 3/002
See application file for complete search history.

(56) References Cited

U.S. PATENT DOCUMENTS

| | | | |
|---|---|---|---|
| 4,203,611 A * | 5/1980 | Makela | B60R 3/002 280/163 |
| 6,203,040 B1 | 3/2001 | Hutchins | |
| 6,270,099 B1 * | 8/2001 | Farkash | B60R 3/002 182/127 |
| 6,588,783 B2 | 7/2003 | Fichter | |
| 6,874,801 B2 | 4/2005 | Fichter | |
| 7,416,202 B2 | 8/2008 | Fichter | |
| 7,717,444 B2 | 5/2010 | Fichter | |
| 7,909,344 B1 | 3/2011 | Bundy | |
| 8,016,309 B2 * | 9/2011 | Flajnik | B60R 3/002 280/169 |
| 8,403,348 B1 | 3/2013 | Wang | |
| 8,641,068 B1 | 2/2014 | Bundy | |
| 9,156,406 B2 | 10/2015 | Stanesic et al. | |
| 9,278,650 B2 * | 3/2016 | Meszaros | B60R 9/02 |
| 9,586,527 B1 | 3/2017 | Salter | |
| 9,637,178 B1 | 5/2017 | Diller et al. | |
| 9,676,337 B2 | 6/2017 | Du et al. | |
| 9,902,327 B1 | 3/2018 | Singh et al. | |
| 9,937,865 B1 | 4/2018 | Oakley | |
| 10,011,231 B1 | 7/2018 | Wymore | |
| 2005/0179226 A1 | 8/2005 | Kolpasky | |
| 2009/0267374 A1 * | 10/2009 | Mulder | B60R 3/002 280/164.1 |
| 2016/0355138 A1 | 12/2016 | Smith et al. | |
| 2018/0111562 A1 | 4/2018 | Crandall et al. | |
| 2018/0162266 A1 * | 6/2018 | Hoek | B60Q 1/2696 |
| 2019/0047477 A1 | 2/2019 | Crandall | |
| 2020/0361386 A1 * | 11/2020 | Schoonover | B60R 3/002 |

FOREIGN PATENT DOCUMENTS

DE 202015100022 U1 2/2015

\* cited by examiner

*Primary Examiner* — Bryan A Evans
(74) *Attorney, Agent, or Firm* — Dinsmore & Shohl LLP

(57) ABSTRACT

A side step assembly includes a side step assembly including a step body having an elongated length that extends in a vehicle longitudinal direction. The step body includes a first elongated body part having a first exterior facing surface that defines a stepping area and a second elongated body part having a second exterior facing surface that faces away from the first exterior surface. The first and second elongated body parts being formed as separate parts and connected together forming a divide that extends the elongated length of the step body.

18 Claims, 10 Drawing Sheets

US 11,919,480 B2

ADJUSTABLE VEHICLE SIDE STEP ASSEMBLIES FORMED BY MULTI-PIECE BODIES

TECHNICAL FIELD

The present specification generally relates to side step assemblies and, more specifically, side step assemblies formed by multi-piece bodies.

BACKGROUND

A vehicle side step assembly is an accessory that has popularity among higher profile vehicles. Some conventional side step assemblies may generally include an elongated, tubular body that is formed as a single piece extrusion with a closed cross-sectional shape. The body may then be further machined in order to provide various surface features, such as openings. Such closed cross-sectional shapes and dimensional requirements can limit the methods used to form the various surface features. Further, the current side step assemblies may have tubular bodies that are chrome-plated. Single piece tubular bodies may require the entire body to be chrome-plated, even the non-visible surfaces.

Accordingly, a need exists for alternative side step assemblies that are formed by multi-piece bodies that may be more readily manufactured and assembled.

SUMMARY

In one embodiment, a side step assembly includes a side step assembly including a step body having an elongated length that extends in a vehicle longitudinal direction. The step body includes a first elongated body part having a first exterior facing surface that defines a stepping area and a second elongated body part having a second exterior facing surface that faces away from the first exterior surface. The first and second elongated body parts being formed as separate parts and connected together forming a divide that extends at least a portion of the elongated length of the step body.

In another embodiment, a side step assembly includes a step body having an elongated length that extends in a vehicle longitudinal direction. The step body includes a first elongated body part having a first exterior facing surface that defines a stepping area and a second elongated body part having a second exterior facing surface that faces away from the first exterior surface. The first and second elongated body parts being formed as separate parts and connected together using a hinge feature.

In another embodiment, a method of assembling a side step assembly is provided. The method includes inserting a hinge feature of a second elongated body part of a step body into a groove of a first elongated body part. The second elongated body part and hinge feature are rotated relative to the first elongated body part. The first and second elongated body parts are connected together to form the step body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure is generally directed to vehicle side step assemblies that include a step body having an elongated length that extends in a vehicle longitudinal direction. The step body is formed by two sections including a first elongated body part having a first exterior facing surface that defines a stepping area and a second elongated body part having a second exterior facing surface that faces away from the first exterior facing surface. The first and second elongated body parts are formed as separate parts and connected together forming a divide that extends the elongated length of the step body.

Figure 1:
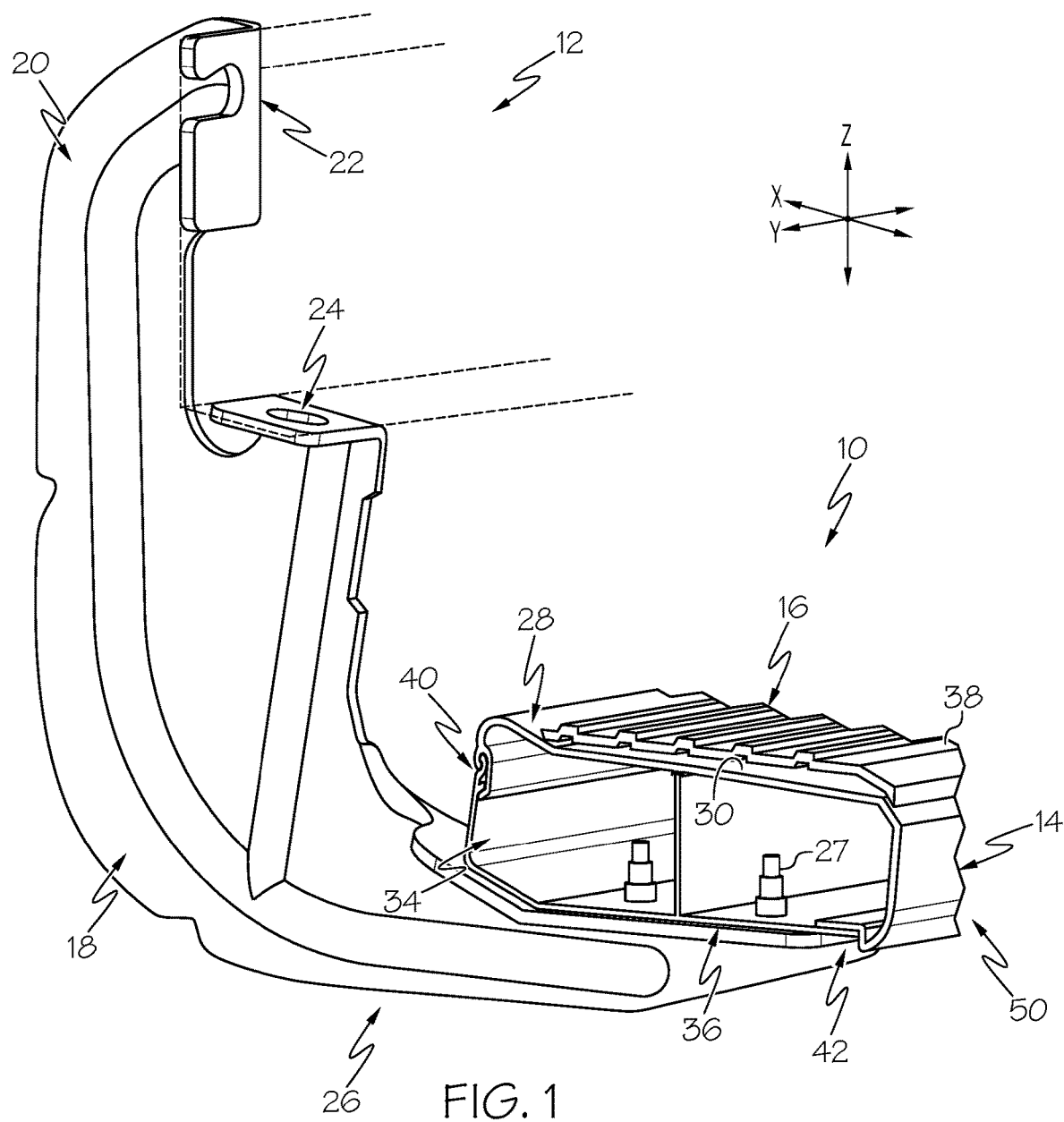
FIG. 1 is a diagrammatic perspective view of a side step assembly coupled to a frame of a vehicle, according to one or more embodiments shown and described herein.

Referring to FIG. 1, a side section view of a side step assembly 10 coupled to a vehicle (represented by broken lines 12) is illustrated. The side step assembly 10 includes a step body 14 that has an elongated length that extends in a vehicle longitudinal direction Y. The step body 14 may extend along a majority of a passenger cabin such that the step body 14 extends under both a front passenger door opening and a rear passenger door opening. It is contemplated that the step body 14 may be any length suitable for providing a stepping area 16 thereon. For example, in some embodiments the step body 14 may only extend a width of a vehicle door opening. In other embodiments, the step body 14 may extend beyond the passenger cabin toward a rear of the vehicle 10. For example, when the vehicle 10 is a truck, it may be desirable for the step body 14 to extend along a portion of the truck bed such that the side step assembly 10 can be used for accessing the truck bed. At either end of the step body 14 may be an end cap coupled thereto.

One or more mounting braces 18 may be used to mount the side step assembly 10 to the vehicle 12. The mounting brace 18 may include a relatively vertical portion 20 that mounts to the vehicle 12 at mounting areas 22 and 24 and a relatively horizontal portion 26 that mounts to an underside of the step body 14 (e.g., using fasteners 27) firmly holding and supporting the side step assembly 10 relative to the vehicle 12. The mounting brace 18 that is illustrated is merely exemplary and any suitable mounting brace configuration may be used.

The step body 14 is formed by two sections including a first elongated body part 28 having a first exterior facing surface 30 that defines the stepping area 16 and a second elongated body part 34 having a second exterior facing surface 36 that faces away from the first exterior surface 30. In the illustrated mounted configuration, the first exterior facing surface 30 faces upward in a vehicle vertical direction Z and the second exterior facing surface 36 faces downward toward the ground. In some embodiments, one or more step pad 38 may be located on the first exterior facing surface 30 for increased traction when stepping on the side step assembly 10. As will be described in greater detail below, the first and second elongated body parts 28 and 34 are formed as separate parts and connected together forming a divide 40, 42 that extends the elongated length of the step body 14.

Figure 2:
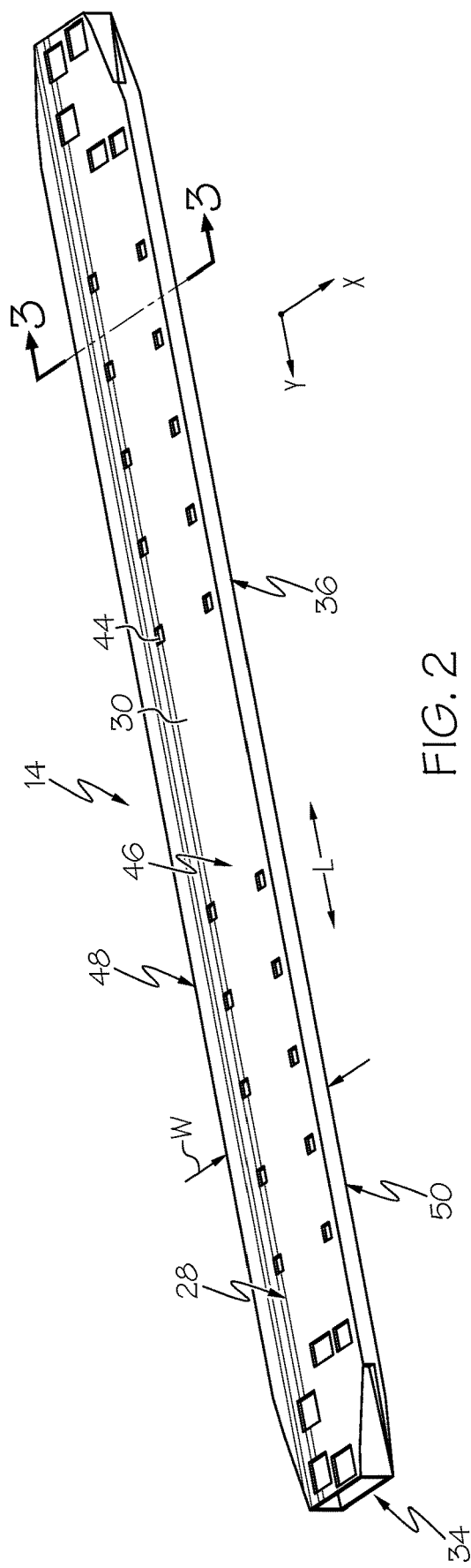
FIG. 2 is a perspective view of a step body of the side step assembly of FIG. 1, according to one or more embodiments shown and described herein.

Referring now to FIG. 2, the step body 14 is illustrated in isolation with the step pad 38 removed thereby exposing more of the first exterior facing surface 30. As can be seen, the step body 14 has the elongated length L that extends in the vehicle longitudinal direction. In this regard, the dimension of the elongated length L in the vehicle longitudinal direction Y is much greater than the dimension of a width W of the step body 14 in a vehicle lateral direction X. Various openings 44 are provided through the first and/or second exterior facing surface 30 and 36. The openings 44 may be used for mounting the step pad 38, brace mounting holes (see FIG. 1), drain holes if needed, and/or powder coating and chrome plating the step body 14.

Referring also to FIG. 1, the step body 14 may be a hollow tube constructed of any suitable material, for example, aluminum, steel, plastic, and the like. The step body 14 may be manufactured through any suitable process, for example, extrusion. The step body 14 may have an outer cross-section perimeter that is any suitable polygonal or non-polygonal shape (e.g., triangles, squares, rectangles, circles, ovals, etc.). In the illustrated example, the outer cross-section perimeter of the step body 14 is somewhat irregular, but generally rectangular shape, particularly in a central section 46. At an inner edge 48, the step body 14 may extend upward to provide a tactile feature and at an outer edge 50, the step body 14 may extend downward to engage the mounting brace 18 (FIG. 1) and provide an anti-slip feature for the step body 14.

Figure 3:
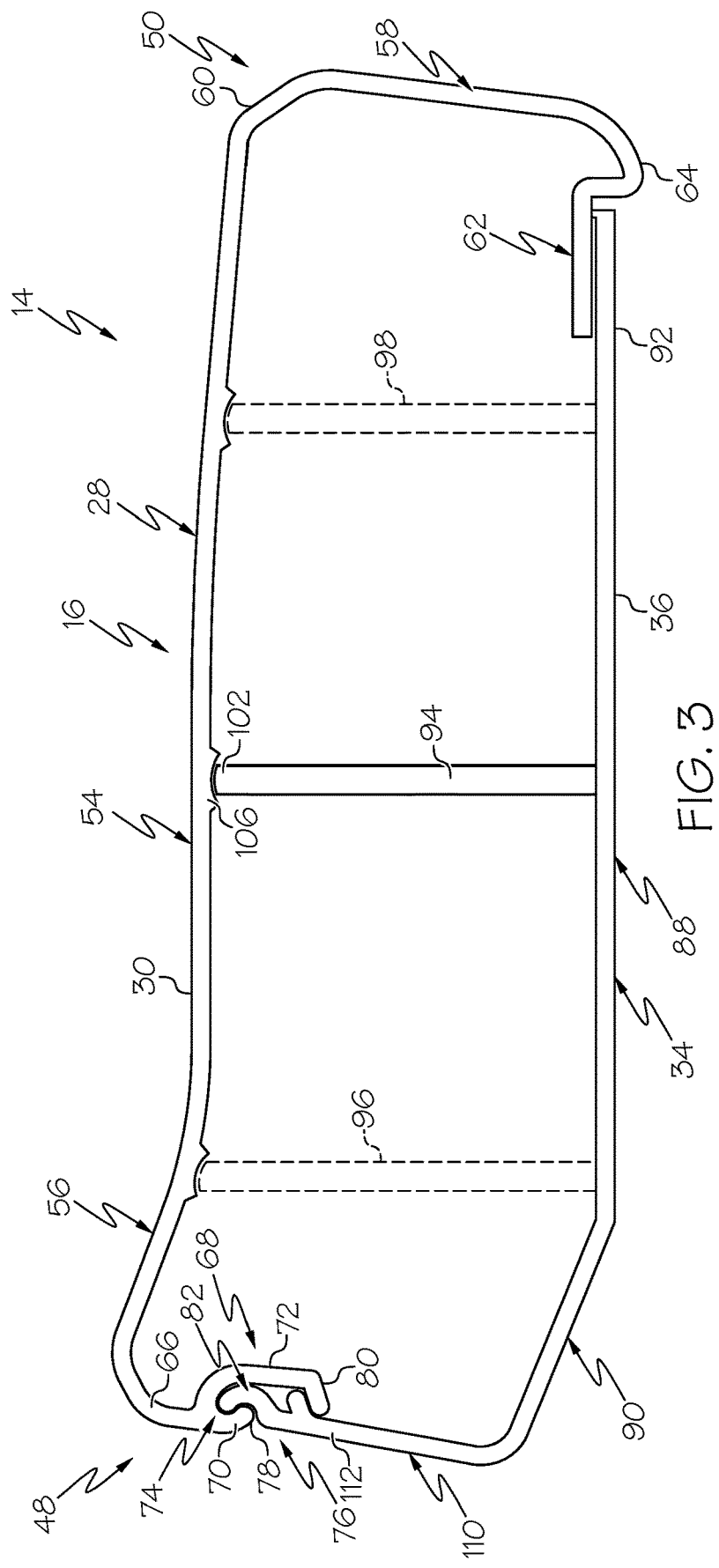
FIG. 3 is a section view of the step body along line 3-3 of FIG. 2, according to one or more embodiments shown and described herein.

Referring now to FIG. 3, a diagrammatic section view of the step body 14 is illustrated. The step body 14 includes the first elongated body part 28 that has the first exterior facing surface 30 and the second elongated body part 34 that has the second exterior facing surface 36. The first elongated body part 28 forms the stepping area 16 and includes a generally horizontal portion 54 that extends laterally outward from a sloped portion 56 to the outer edge 50. The sloped portion 56 forms the tactile feature at the inner edge 48 of the step body 14. A vertical portion 58 extends downward from the horizontal portion 54 at corner 60 and another horizontal portion 62 extends inward from the vertical portion 58 at corner 64.

At the inner edge 48, another vertical portion 66 extends downward from the horizontal portion 54. The vertical portion 66 includes a groove feature 68 that is formed by a first leg 70 and a second leg 72 that is spaced laterally outward from the first leg 70 forming an inverted U-shaped groove 74. The first leg 70 is shorter than the second leg 72 to provide a gap 76 between an end 78 of the first leg 70 and a catch portion 80 of the second leg 72. The gap 76 provides an entry point for a cooperating interlocking hinge feature 82 to be inserted into the groove 74 and rotated to an interlocked configuration as shown by FIG. 3.

The second elongated body part 34 includes a generally horizontal portion 88 that extends laterally outward from a sloped portion 90 to the outer edge 50, terminating at an outer end 92. The outer end 92 is mated against the horizontal portion 62. Any suitable connection may be used to connect the first and second elongated body parts 28 and 34, such as fasteners, welding, adhesive, etc. A vertically extending support leg 94 may extend outward from the horizontal portion 88. More than one support leg (represented by broken lines 96, 98) may be provided depending on support needs. The support leg 94 may have terminal edge 102 that engages inside surface portion 106 of the horizontal portion 54 of the first elongated body part 28. In some embodiments, the inside surface portion 106 may include a notch (also element 106) that receives the terminal edge 102. The support leg 94 can provide additional vertical support for the stepping area 16. A vertical portion 110 extends upwardly from the sloped portion 90. The hinge feature 82 is located at an edge 112 of the vertical portion 110.

Figure 4:
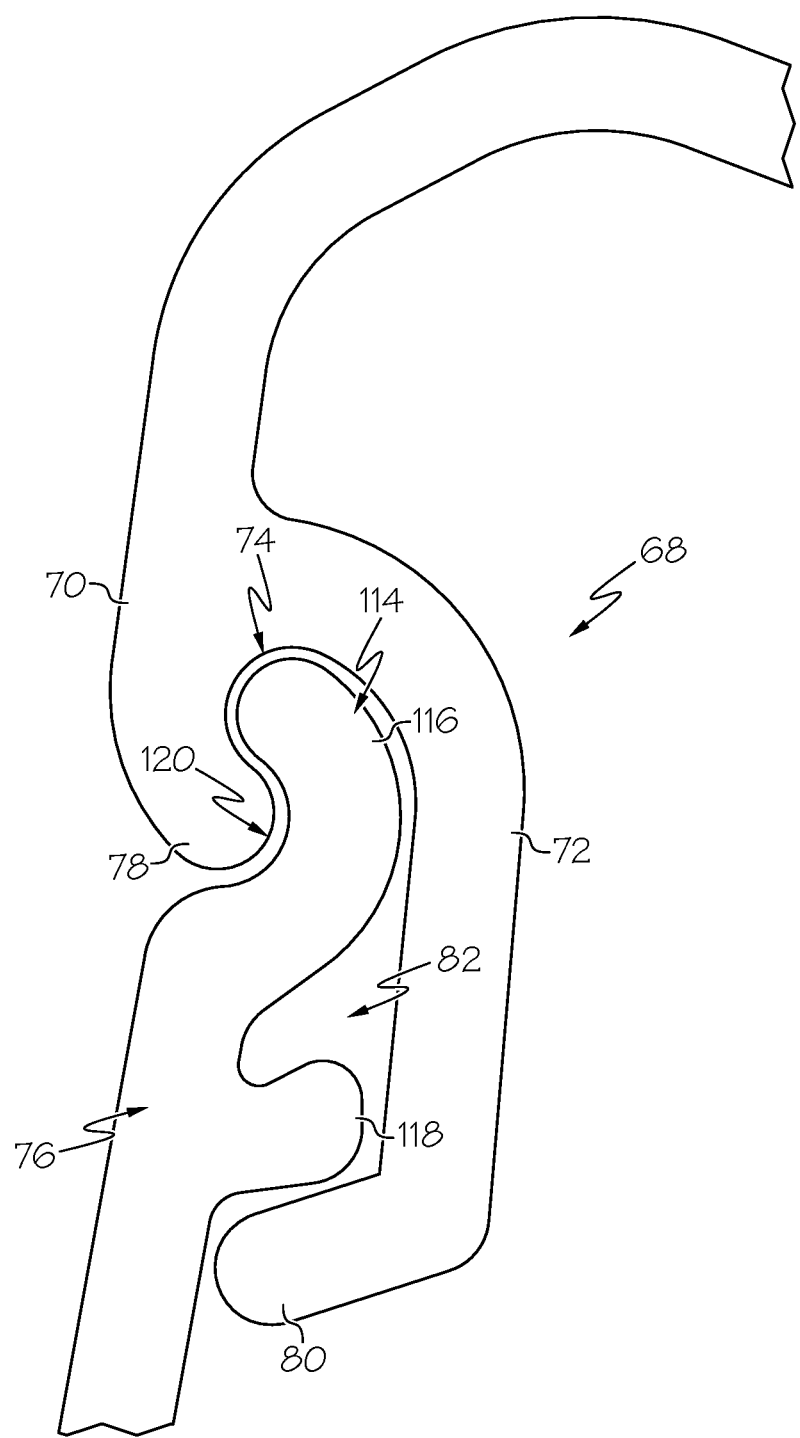
FIG. 4 is a closer view of a hinge and groove feature for use in connecting first and second elongated body parts of the step body of FIG. 3, according to one or more embodiments shown and described herein.

FIG. 4 illustrates a closer view of the groove and hinge features 68 and 82 in the interlocked configuration. The groove feature 68 includes the first leg 70 and the second leg 72 forming the U-shaped groove 74. The first leg 70 is shorter than the second leg 72 providing the gap 76. As can be seen, the first leg 70 is curved inward toward the second leg 72 providing the groove 74 with a curved portion 114.

The hinge feature 82 includes a first leg 116 and a second leg 118. The first leg 116 extends vertically and is curved toward the first leg 70 of the groove feature 68 to substantially match the curvature of the curved portion 114. In this regard, the curvature of the first leg 116 of the hinge feature 82 provides a groove 120 that receives the end 78 of the first leg 70 in the illustrated interlocked configuration. Further, in the interlocked configuration, the second leg 118 engages the sloped catch portion 80 of the second leg 72 of the groove feature 68. As shown, the second leg 118 and the catch portion 80 may extend at about the same angle to vertical in the interlocked configuration in order to engage one another.

Figure 5:
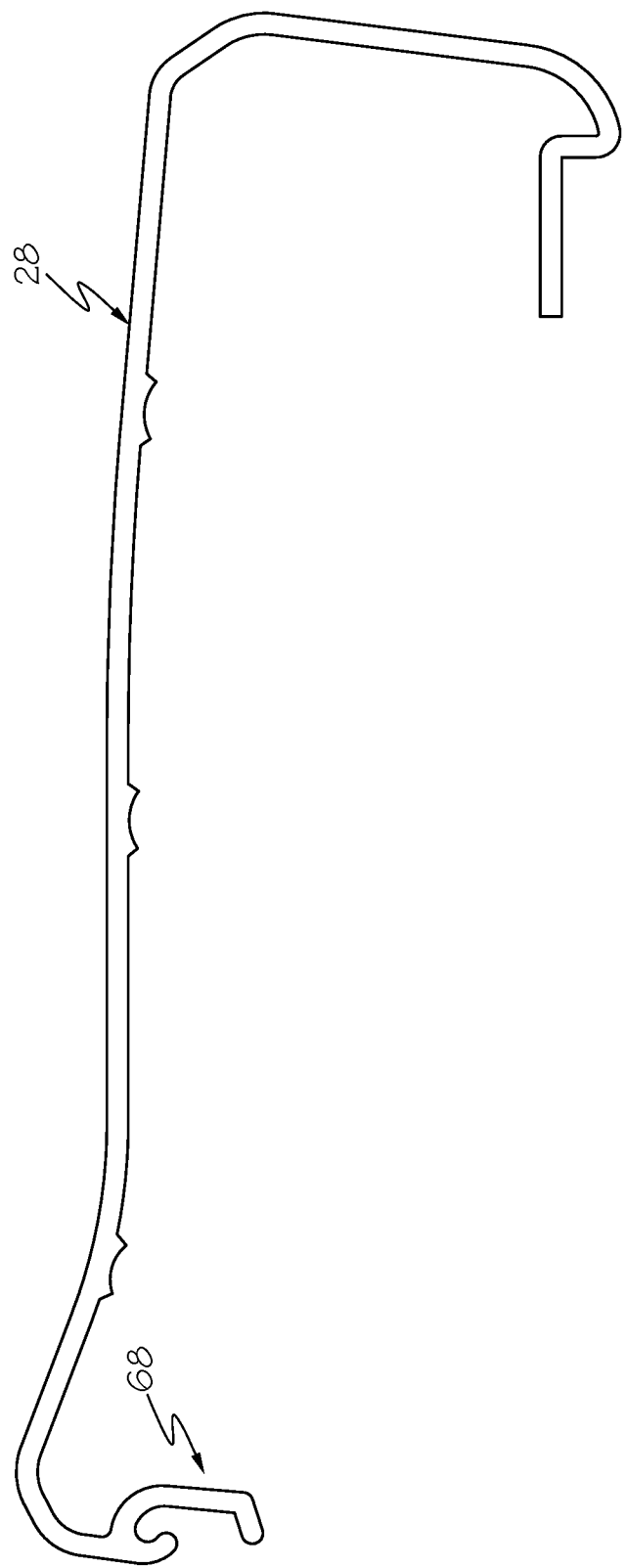
FIG. 5 is a diagrammatic section view of the first elongated body part of FIG. 3, according to one or more embodiments shown and described herein.
Figure 6:
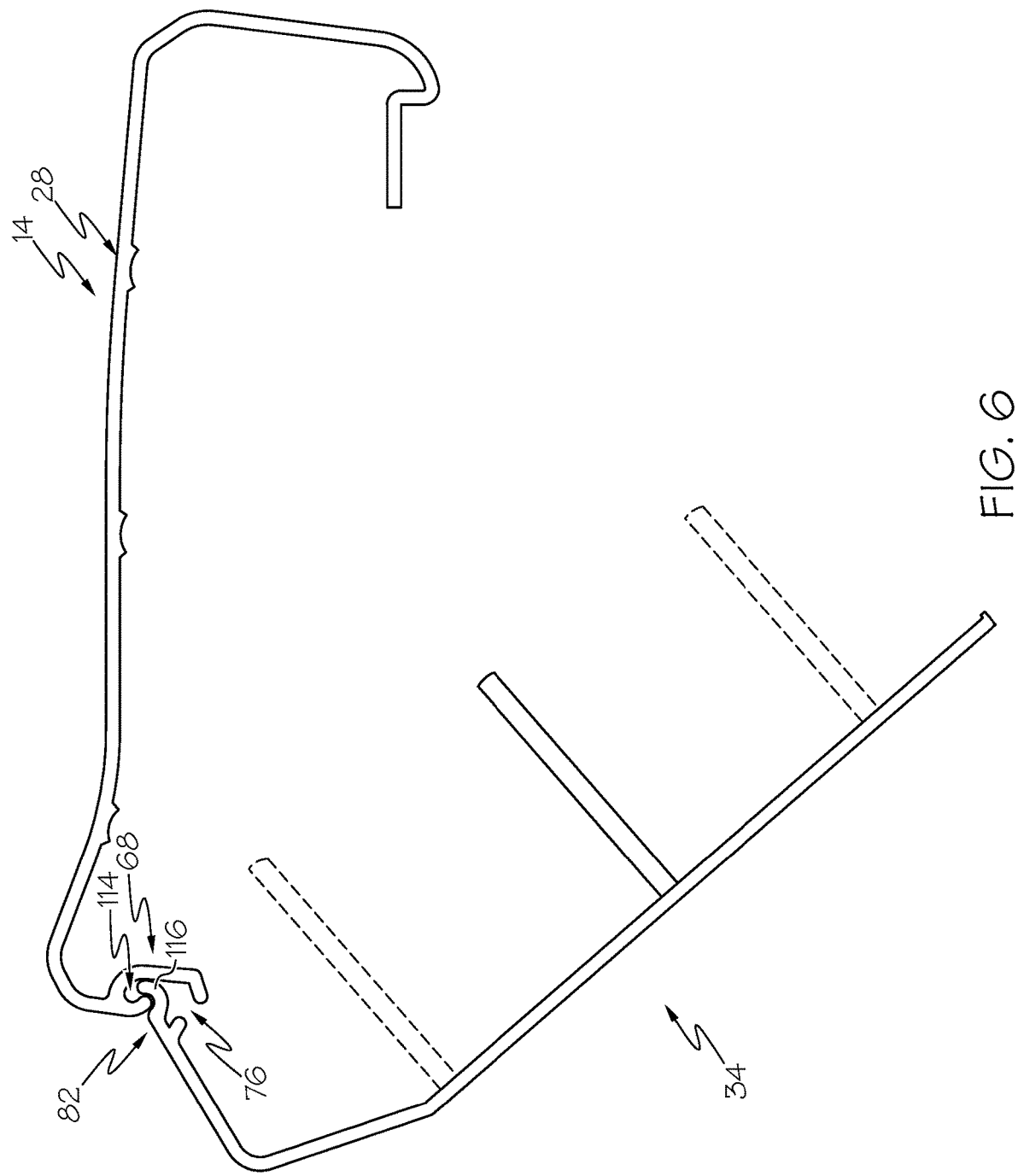
FIG. 6 illustrates a method of connecting first and second elongated body parts to form the step body of FIG. 3, according to one or more embodiments shown and described herein.
Figure 7:
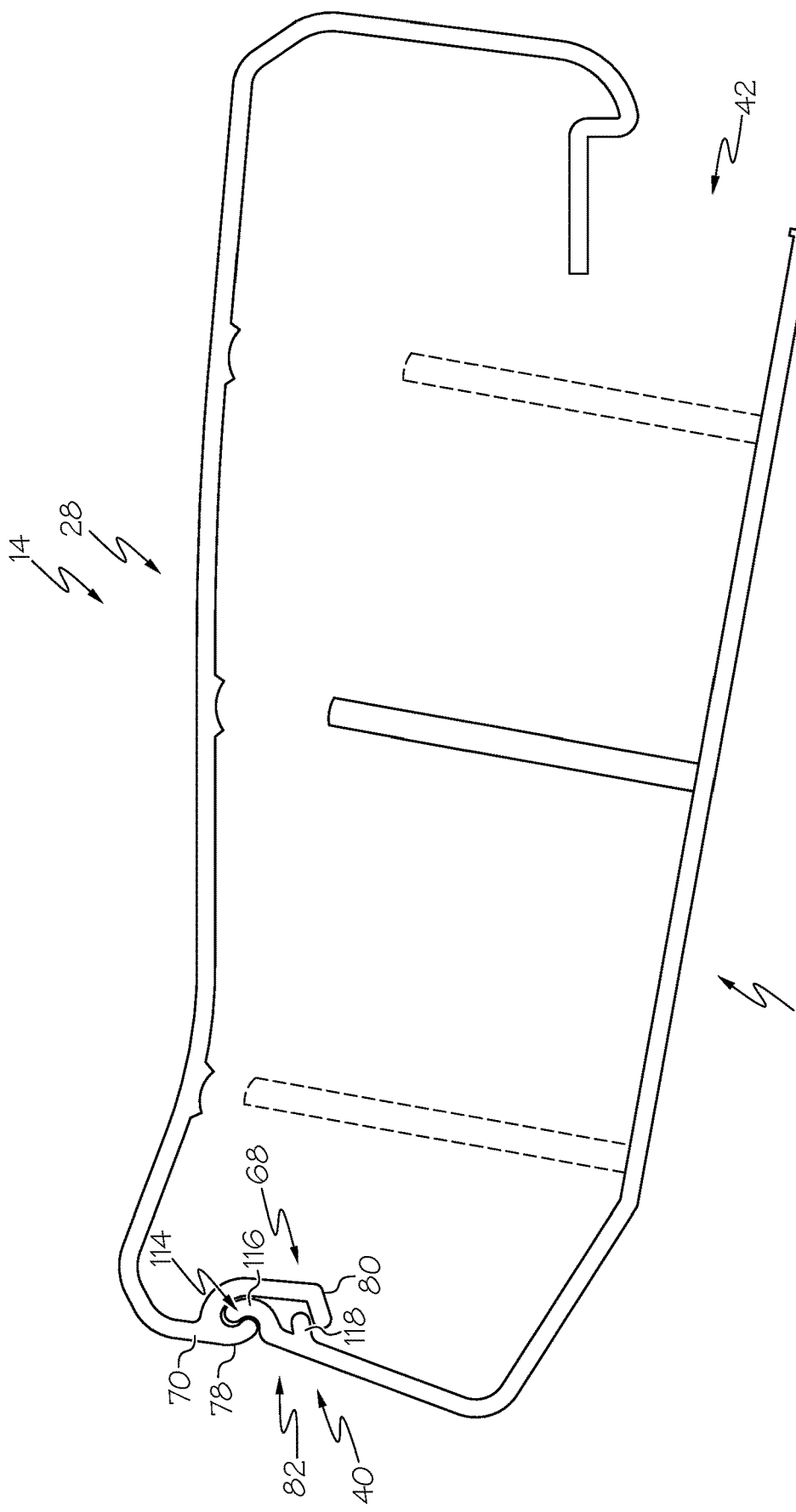
FIG. 7 illustrates the method of connecting first and second elongated body parts to form the step body of FIG. 3, according to one or more embodiments shown and described herein.
Figure 8:
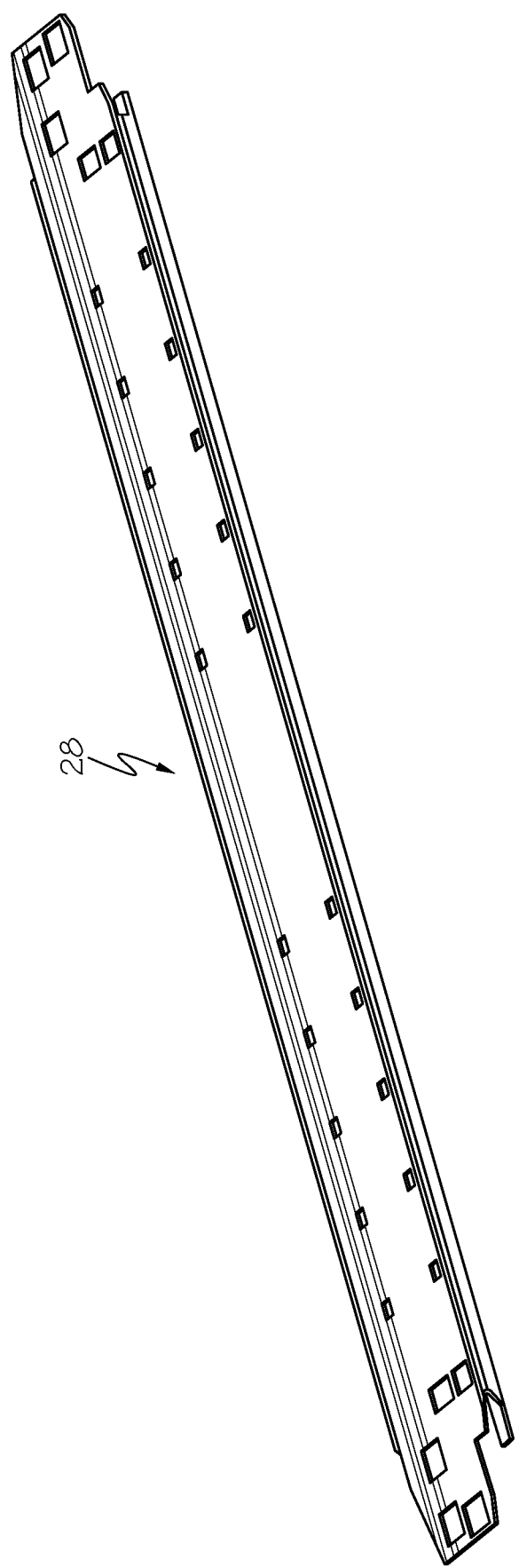
FIG. 8 is a perspective view of an inside of the first elongated body part of the step body of FIG. 2, according to one or more embodiments shown and described herein.
Figure 9:
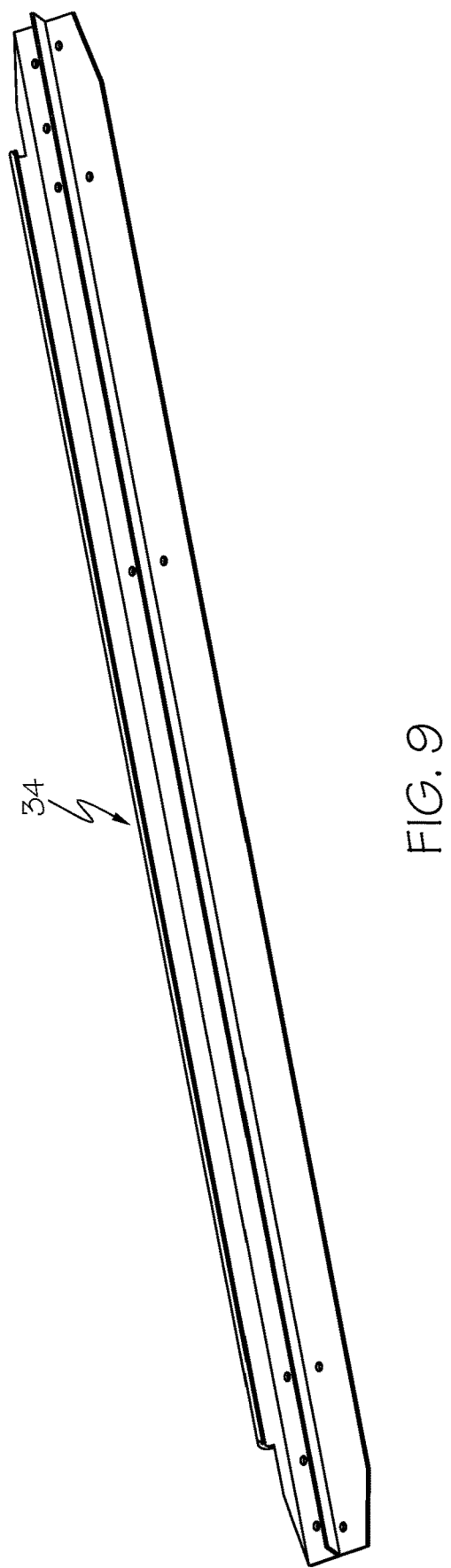
FIG. 9 is a perspective view of an inside of the second elongated body part of the step body of FIG. 2, according to one or more embodiments shown and described herein.

FIGS. 5-7 illustrate the step body 14 in a process of being assembled. FIG. 5 illustrates the first elongated body part 28 in isolation providing the groove feature 68 to receive the hinge feature 82. Referring to FIG. 6, the second elongated body part 34 is rotated relative to the first elongated body part 28 and the first leg 116 is inserted through the gap 76 and into the curved portion 114 of the groove feature 68. Referring to FIG. 7, the second elongated body part 34 may then be rotated, which rotates the first leg 116 further into the curved portion 114 by rotating the first leg 116 about the end 78 of the first leg 70, where the end 78 provides a datum about which the first leg 116 pivots and both of the first and second legs 116 and 118 move into a position where the second leg 118 can be moved into engagement with the catch portion 80, as shown by FIG. 4. Then, the first elongated body part 28 and the second elongated body part 34 can be connected together using any suitable connection (e.g., fastening, adhering, welding, brazing, friction fitting) forming the divide 40, 42 between the first and second elongated body parts 28 and 34 that may or may not be openable, depending on the method of connection. FIGS. 8 and 9, respectively, illustrate the first elongated body part 28 and the second elongated body part 34 formed separately, prior to connecting them together. As can be appreciated a divide extends the elongated length of the assembled step body 14.

Figure 10:
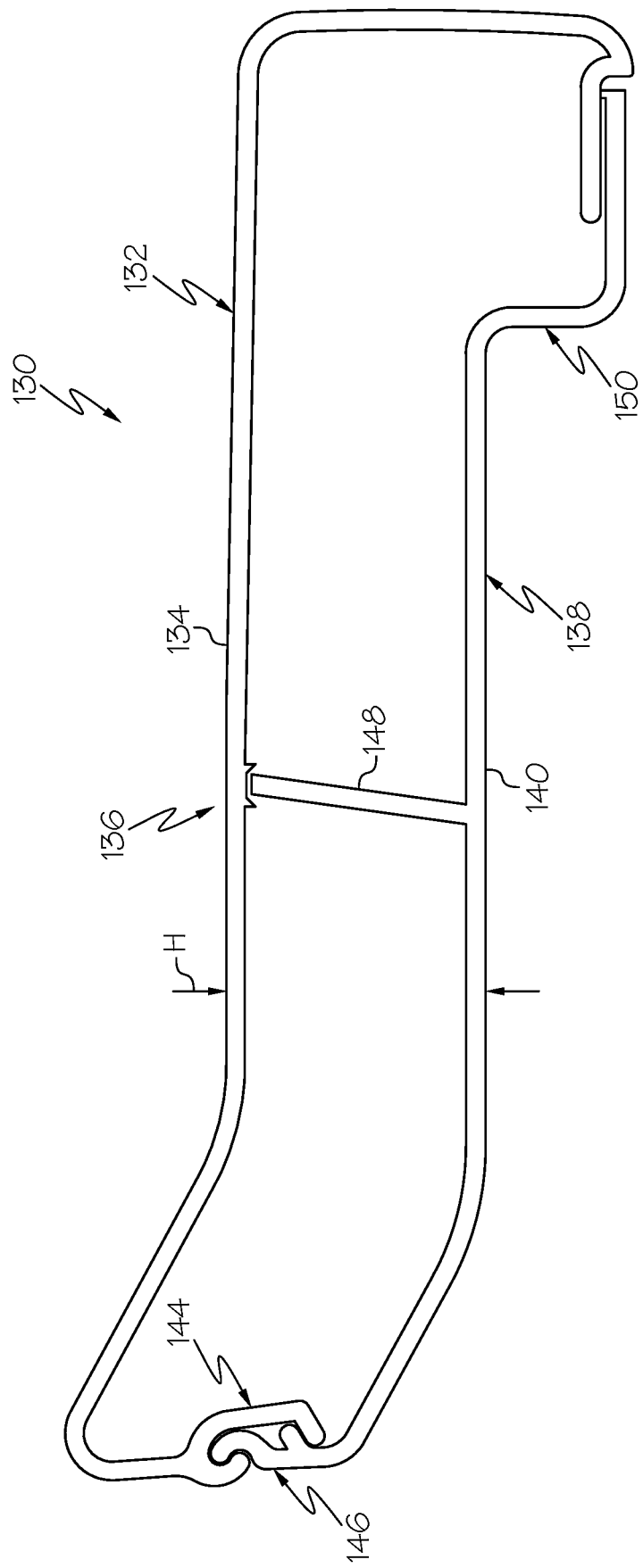
FIG. 10 is a diagrammatic section view of another side step assembly, according to one or more embodiments shown and described herein.

Referring now to FIG. 10, various side step assembly embodiments are contemplated having different configurations. The side step assembly of FIG. 10 illustrates a multi-piece step body 130 having a relatively low-profile compared to the step body 14. The step body 130 includes many of the features described above including a first elongated body part 132 having a first exterior facing surface 134 that defines a stepping area 136 and a second elongated body part 138 having a second exterior facing surface 140 that faces away from the first exterior surface 142. As above, groove and hinge features 144 and 146 are used to connect the first and second elongated body parts 132 and 138 together. In this embodiment, the second elongated body part 138 has a single leg 148 that engages the first elongated body part 132 and has an additional vertical portion 150 that can be provided to help reduce a height H of the step body 130 in locations.

The above-described side step assemblies provide a multi-piece step body structure that includes a first elongated body part and a second elongated body part. A hinge feature is provided that provides a datum for connecting the first and second elongated body parts together. The multi-piece body configuration can allow for increased flexibility during manufacture that can be easier to perform and accomplished at increased speed. The first and second elongated body parts can be extruded, molded, milled, additive manufactured, etc. The first and second elongated body parts can be plated, painted, powder coated separately and with different or no finish. The high cost of plating and/or surface treatment for surfaces can be reduced. Various features and contours can be added to the separate first and second elongated body parts.

The hinged assembly feature allows for production tolerances and part twist from the manufacturing processes, which can cause friction and interference for sliding pieces. The hinged configuration can allow the first and second elongated body parts to be assembled without sliding and can provide a secure joint between the first and second elongated body parts. Integrated locking features can be designed into the first and second elongated body parts for assembly and joining.

Embodiments can be described with reference to the following numbered clauses, with preferred features laid out in the dependent clauses:

Clause 1: A side step assembly comprising: a step body having an elongated length that extends in a vehicle longitudinal direction, the step body comprising: a first elongated body part having a first exterior facing surface that defines a stepping area; and a second elongated body part having a second exterior facing surface that faces away from the first exterior surface, the first and second elongated body parts being formed as separate parts and connected together forming a divide that extends at least a portion of the elongated length of the step body.

Clause 2: The side step assembly of clause 1, wherein the first elongated body part comprises a horizontal portion that extends outward between an inner edge of the step body and an outer edge of the step body.

Clause 3: The side step assembly of clause 2, wherein the first elongated body part comprises a vertical portion that extends downward at the inner edge of the step body, the vertical portion comprising a groove feature configured to receive a portion of the second elongated body part.

Clause 4: The side step assembly of clause 3, wherein the second elongated body part comprises a horizontal portion that extends between the inner edge and the outer edge of the step body.

Clause 5: The side step assembly of clause 4, wherein the portion of the second elongated body part comprises a vertical portion that extends upward from the horizontal portion of the second elongated body part, the vertical portion comprising a hinge feature that is received within the groove feature.

Clause 6: The side step assembly of clause 5, wherein the groove feature comprises a first leg and a second leg that are spaced-apart laterally forming a groove, wherein the first leg is shorter than the second leg thereby providing a gap between ends of the first leg and the second leg that is configured to receive the hinge feature.

Clause 7: The side step assembly of clause 6, wherein hinge feature comprises another first leg and another second leg that extend outward from the vertical portion of the second elongated body part, wherein the another first leg and the another second leg are received within the groove through the gap.

Clause 8: The side step assembly of any of clauses 1-7, wherein the first elongated body part includes a surface treatment that is different from the second elongated body part.

Clause 9: A side step assembly comprising: a step body having an elongated length that extends in a vehicle longitudinal direction, the step body comprising: a first elongated body part having a first exterior facing surface that defines a stepping area; and a second elongated body part having a second exterior facing surface that faces away from the first exterior surface, the first and second elongated body parts being formed as separate parts and connected together using a hinge feature.

Clause 10: The side step assembly of clause 9, wherein the first elongated body part comprises a horizontal portion that extends outward between an inner edge of the step body and an outer edge of the step body.

Clause 11: The side step assembly of clause 10, wherein the first elongated body part comprises a vertical portion that extends downward at the inner edge of the step body, the vertical portion comprising a groove feature configured to receive a portion of the second elongated body part.

Clause 12: The side step assembly of clause 11, wherein the second elongated body part comprises a horizontal portion that extends between the inner edge and the outer edge of the step body.

Clause 13: The side step assembly of clause 12, wherein the portion of the second elongated body part comprises a vertical portion that extends upward from the horizontal portion of the second elongated body part, the vertical portion comprising a hinge feature that is received within the groove feature.

Clause 14: The side step assembly of clause 13, wherein the groove feature comprises a first leg and a second leg that are spaced-apart laterally forming a groove, wherein the first leg is shorter than the second leg thereby providing a gap between ends of the first leg and the second leg that is configured to receive the hinge feature.

Clause 15: The side step assembly of clause 14, wherein the hinge feature comprises another first leg and another second leg that extend outward from the vertical portion of the second elongated body part, wherein the another first leg and the another second leg are received within the groove through the gap.

Clause 16: The side step assembly of any of clauses 9-15, wherein the first elongated body part includes a surface treatment that is different from the second elongated body part.

Clause 17: A method of assembling a side step assembly, comprising: inserting a hinge feature of a second elongated body part of a step body into a groove of a first elongated body part; rotating the second elongated body part and hinge feature relative to the first elongated body part; and connecting the first and second elongated body parts together to form the step body.

Clause 18: The method of clause 17 further comprising extruding the first and second elongated body parts.

Clause 19: The method of clause 17 further comprising surface treating one or both of the first and second elongated body parts.

Clause 20: The method of clause 17 further comprising forming one or more openings in one or both of the first and second body parts.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A side step assembly comprising:
a step body having an elongated length that extends in a vehicle longitudinal direction, the step body comprising:
a first elongated body part having a first exterior facing surface that defines a stepping area;
a second elongated body part having a second exterior facing surface that faces away from the first exterior surface, the first and second elongated body parts being formed as separate parts and connected together forming a divide that extends at least a portion of the elongated length of the step body; and
a hinge feature that is located between a first vertical portion of the first elongated body part and a second vertical portion of the second elongated body part, the hinge feature received by a groove feature that is located between the first vertical portion and the second vertical portion such that the hinge feature and groove feature are spaced vertically from both the first exterior facing surface and the second exterior facing surface.

2. The side step assembly of claim 1, wherein the first elongated body part comprises a horizontal portion that extends outward between an inner edge of the step body and an outer edge of the step body, the hinge feature and groove feature located on the inner edge of the step body.

3. The side step assembly of claim 2, wherein the first elongated body part comprises the first vertical portion that extends downward at the inner edge of the step body.

4. The side step assembly of claim 3, wherein the second elongated body part comprises a horizontal portion that extends between the inner edge and the outer edge of the step body.

5. The side step assembly of claim 4, wherein the groove feature comprises a first leg and a second leg that are spaced-apart laterally forming a groove, wherein the first leg is shorter than the second leg thereby providing a gap between ends of the first leg and the second leg that is configured to receive the hinge feature.

6. The side step assembly of claim 5, wherein the hinge feature comprises another first leg and another second leg that extend outward from the vertical portion of the second elongated body part, wherein the another first leg and the another second leg are received within the groove through the gap.

7. The side step assembly of claim 1, wherein the first elongated body part includes a surface treatment that is different from the second elongated body part.

8. A side step assembly comprising:
a step body having an elongated length that extends in a vehicle longitudinal direction, the step body comprising:
a first elongated body part having a first exterior facing surface that defines a stepping area; and
a second elongated body part having a second exterior facing surface that faces away from the first exterior surface, the first and second elongated body parts being formed as separate parts and connected together using a hinge feature;
wherein the hinge feature that is located between a first vertical portion of the first elongated body part and a second vertical portion of the second elongated body part, the hinge feature received by a groove feature that is located between the first vertical portion and the second vertical portion such that the hinge feature and groove feature are spaced vertically from both the first exterior facing surface and the second exterior facing surface.

9. The side step assembly of claim 8, wherein the first elongated body part comprises a horizontal portion that extends outward between an inner edge of the step body and an outer edge of the step body, the hinge feature located on the inner edge of the step body.

10. The side step assembly of claim 9, wherein the first elongated body part comprises the first vertical portion that extends downward at the inner edge of the step body.

11. The side step assembly of claim 10, wherein the second elongated body part comprises a horizontal portion that extends between the inner edge and the outer edge of the step body.

12. The side step assembly of claim 11, wherein the groove feature comprises a first leg and a second leg that are spaced-apart laterally forming a groove, wherein the first leg is shorter than the second leg thereby providing a gap between ends of the first leg and the second leg that is configured to receive the hinge feature.

13. The side step assembly of claim 12, wherein the hinge feature comprises another first leg and another second leg that extend outward from the vertical portion of the second elongated body part, wherein the another first leg and the another second leg are received within the groove through the gap.

14. The side step assembly of claim 8, wherein the first elongated body part includes a surface treatment that is different from the second elongated body part.

15. A method of assembling a side step assembly, comprising:
- inserting a hinge feature of a second elongated body part of a step body into a groove of a first elongated body part, the hinge feature located between a first vertical portion of the first elongated body part and a second vertical portion of the second elongated body part, the hinge feature received by a groove feature that is located between the first vertical portion and the second vertical portion such that the hinge feature and groove feature are spaced vertically from both a first exterior facing surface of the first elongated body part and a second exterior facing surface of the second elongated body part;
- rotating the second elongated body part and hinge feature relative to the first elongated body part; and
- connecting the first and second elongated body parts together to form the step body.

16. The method of claim 15 further comprising extruding the first and second elongated body parts.

17. The method of claim 15 further comprising surface treating one or both of the first and second elongated body parts.

18. The method of claim 15 further comprising forming one or more openings in one or both of the first and second body parts.

* * * * *